(12) United States Patent
Chen

(10) Patent No.: US 7,128,326 B2
(45) Date of Patent: Oct. 31, 2006

(54) STROLLER BACKREST TILTING ADJUSTING DEVICE

(75) Inventor: Jui-Lung Chen, Kaohsiung (TW)

(73) Assignee: Adora Business Company Limited, Tortola (VG)

( * ) Notice: Subject to any disclaimer, the term of this patent is extended or adjusted under 35 U.S.C. 154(b) by 276 days.

(21) Appl. No.: 10/940,086

(22) Filed: Sep. 14, 2004

(65) Prior Publication Data

US 2006/0001241 A1 Jan. 5, 2006

(51) Int. Cl.
*B62B 7/06* (2006.01)

(52) U.S. Cl. .................. 280/47.4; 280/642; 280/47.38; 280/47.25; 280/639

(58) Field of Classification Search ............... 280/47.4, 280/642, 47.38, 47.25, 639
See application file for complete search history.

(56) References Cited

U.S. PATENT DOCUMENTS 4,881,303 A * 11/1989 Martini ........................ 24/170
5,457,323 A * 10/1995 Geerlings ............. 250/432 PD
5,482,311 A * 1/1996 Huang ......................... 280/642
2003/0052474 A1* 3/2003 Yang et al. .................. 280/642

FOREIGN PATENT DOCUMENTS

GB  2 375 331 A  4/2002

* cited by examiner

*Primary Examiner*—J. Allen Shriver
*Assistant Examiner*—Cynthia F. Collado
(74) *Attorney, Agent, or Firm*—Scully, Scott, Murphy & Presser, P.C.

(57) ABSTRACT

A stroller backrest tilting adjusting device is provided. The stroller backrest tilting adjusting device comprises two supporting straps for supporting the backrest of the stroller, each supporting strap having a fixed end attached to a frame of the stroller and a free end; a strap direction guiding unit allowing the free end of each of the straps to pass therethrough and guiding the straps' direction; and an adjusting assembly fixed to an upper portion of the backrest which is capable of adjusting the effective supporting length of the straps to thereby adjusting the tilting angle of the backrest of the stroller by operating a one-way locking member, which is disposed in the adjusting assembly and has a cam effecting portion for increasingly exerting locking force.

10 Claims, 10 Drawing Sheets

STROLLER BACKREST TILTING ADJUSTING DEVICE

FIELD OF THE INVENTION

The present invention relates generally to a stroller backrest tilting adjusting device and more particularly, to a stroller backrest tilting adjusting device which can easily adjust the tilting angle of the backrest with one hand in just one single operation.

BACKGROUND OF THE INVENTION

For families that have babies, stroller is one of the most important equipments when the parents need to take the baby to the outdoors, such as go out for a walk or go shopping, etc. Because stroller is used to carry infants/babies, thus safety is the primarily concern in designing a stroller. Therefore, rules and regulations concerning the safety of strollers are made by the government for the stroller manufactures to follow and comply with so as to ensure the infants'/babies' safety. Additional to the safety, comfortableness and operational easiness are two essential issues of modern stroller design.

In order to increase the comfortableness of a stroller for infants/babies to ride in, the tilting angle of a stroller backrest is adjustable. For example, U.S. publication No. 2003/0052474 A1, published on Mar. 20, 2003, disclosed a stroller seat back leaning angle adjusting device which included a constraint element having a hollow body, two spring biased detent elements rotatably installed in the body, and two release elements operably coupled to the detent elements respectively, and two supporting straps on the seat back each having one end attached to a frame of the stroller and the other end inserted into the body from one side of the body, passing through a space between the detent element and the body and extending out of the body at the center of the body. In use, a user has to push the release elements simultaneously with one hand to drive the detent elements to overcome the biasing force so as to allow the detent elements disengaging the straps. At this time, the user need to use the other hand to either pull the free end of straps to tighten the straps for moving the seat back to an upright position, or to push the back downward to move the seat back to a tilted position.

Although this leaning angle adjusting device can perform a seat back leaning angle adjusting function, yet it has a disadvantage in operation. Specifically, the disengaging operation of the adjusting device and the angle adjusting operation are two independent operations in this design, thus a user need to use both his hands to complete a seat back leaning angle adjusting operation. This is inconvenience for a user using the stroller.

UK Patent No. GB 2375331A, published on Nov. 13, 2002, disclosed another stroller seat back tilting angle adjusting device. This adjusting device comprises a strap buckle fixed on a back side of the seat back, two straps for supporting the seat back each having one end thereof attached to a frame of the stroller and the other end being inserted through the strap buckle and locked to the strap buckle by a locking element after passing through a direction turning element. Similar to adjusting device described above, this seat back tilting angle adjusting device requires two hands to perform a smooth tilting angle adjusting operation. Specifically, while adjusting the tilting angle of the seat back, one hand is required to pull up the locking element to cause it disengaging with the straps, and then the other hand is required to either pull the free end of straps to tighten the straps for moving the seat back to an upright position, or to push the seat back downward to a desired tilting angle, and then push down the locking element back on so as to lock the straps to the buckle once again. Because the disengaging/locking operation of the buckle and the seat back angle adjusting operation are two independent operations, thus both user's hands are needed to perform a complete seat back leaning angle adjusting operation, and this is deemed inconvenience for a user to use the stroller.

In view of the inconvenience drawback in existing seat back leaning angle adjusting device of a stroller, there exists a need for seat back leaning angle adjusting device of a stroller which can adjust the leaning angle of the seat back in a simple and convenient way.

SUMMARY OF THE INVENTION

Accordingly, the object of the present invention is to provide a stroller backrest tilting adjusting device which is able to be adjusted with one hand in a single operation so as to overcome the drawback of the existing devices and to provide a easy and simple backrest tilting angle adjusting operation to the user.

To achieve this and other objects, a backrest tilting adjusting device of a stroller comprises:

two supporting straps for supporting a backrest of the stroller, each supporting strap having a fixed end attached to a frame of the stroller and a free end;

a strap direction guiding unit having an elongate opening formed therein to allow the free end of each of the straps passing therethrough to guide the straps' direction; and an adjusting assembly comprising:

a base member attached to an upper portion of the backrest and having a bottom portion, a strap inlet end through which the free ends of the supporting straps enter the adjusting assembly, and a strap outlet end through which the free ends of the supporting straps exit the adjusting assembly, and a strap inserting direction being defined as the direction from strap inlet end to the strap outlet end;

a one-way locking member pivotally coupled to the base member and arranged such that the straps entering the adjusting assembly pass between the base member and one-way locking member, and having a operating portion and a cam effecting portion for increasingly exerting a locking force to the straps; and a biasing member coupled to the base member and the one-way locking member for pivoting the one-way locking member toward the base member such that the cam effecting portion of the one-way locking member may engage with the straps and press them firmly against the base member, and wherein the pivoting direction of the one-way locking member is opposite to the strap inserting direction, and the cam effecting portion of the one-way locking member is adapted such that the locking force exerted by the cam effecting portion to the supporting straps against the base member will increase as the pivoted angle of the one-way locking member increase and eventually reach a level large enough to prevent the supporting straps from moving.

According to one embodiment of the present application, the cam effecting portion comprises a plurality of engaging teeth, each engaging tooth having a distance r away from a pivot center of the one-way locking member and the distance r of each engaging tooth is different from each other. The engaging teeth are arranged such that the engaging tooth having the smallest distance r will engage with the supporting straps when the one-way locking member is pivoted a smallest angle, and the engaging tooth having the largest distance r engages with the supporting straps when the one-way locking member is pivoted a largest angle.

According to another embodiment of the present invention, the free ends of the two supporting straps are bound together and a pull ring is provided thereto.

It is to be appreciated that both the forging general description and the following detailed description are exemplary and explanatory and are intended to provide further explanations of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

FIG. 5b is a partial front cross-sectional view illustrating the corresponding state of the adjusting assembly while the stroller back rest tilting angle adjusting device is in an operation state of FIG. 5a;

FIG. 6b is a partial front cross-sectional view illustrating the corresponding state of the adjusting assembly while the stroller back rest tilting angle adjusting device is in an operation state of FIG. 6a.

DETAILED DESCRIPTION OF THE INVENTION

Figure 1:
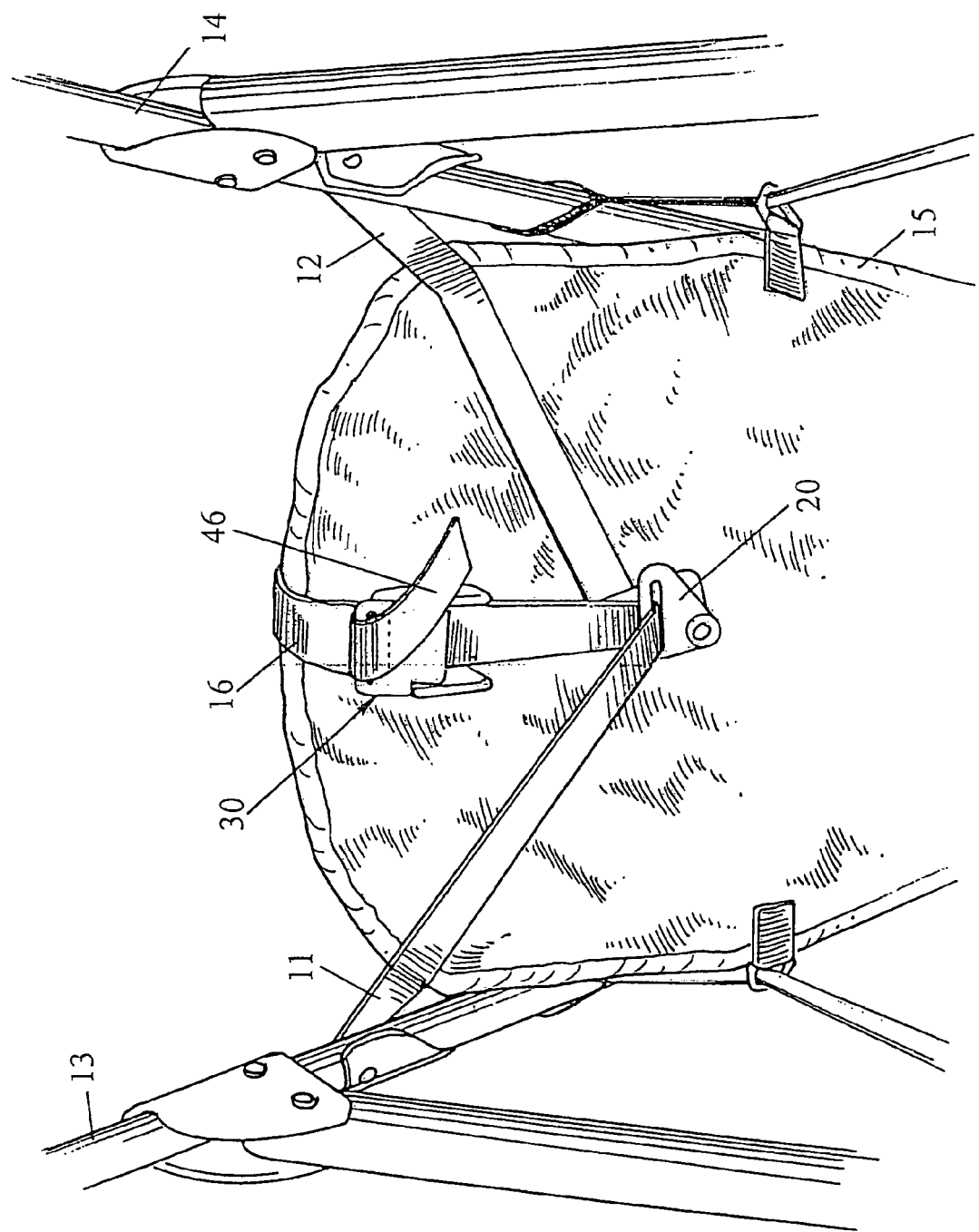
FIG. 1 is a perspective view of a stroller backrest tilting adjusting device according to one embodiment of the present invention.

Referring now to the drawings in which an embodiment of the present invention is illustrated to describe the present invention.

FIG. 1 is a perspective view of a stroller backrest tilting adjusting device according to one embodiment of the present invention As shown in FIG. 1, the stroller backrest tilting adjusting device generally comprises two supporting straps 11, 12, one end of each strips being attached to a frame 13, 14 of the stroller respectively; a strap direction guiding unit 20 fixed to a central portion of a back side of a backrest 15 of the stroller; and an adjusting assembly 30 fixed to an upper portion of the backrest.

Figure 2:
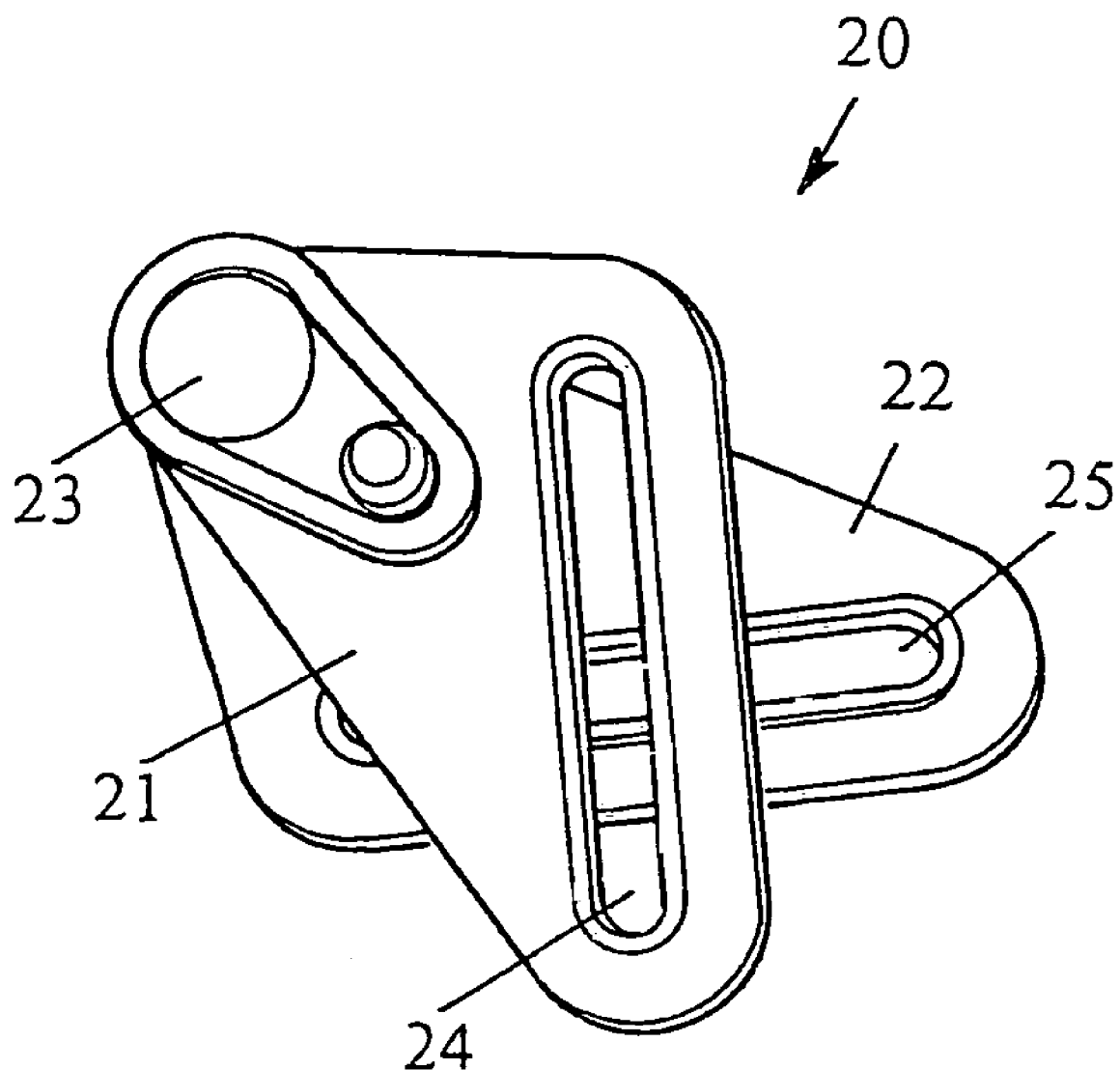
FIG. 2 is a perspective view of a strap direction guiding unit of the stroller backrest tilting adjusting device according to one embodiment of the present invention.

Further referring to FIG. 2, FIG. 2 is a perspective view of a supporting strap direction guiding unit 20 of the stroller backrest tilting adjusting device. As illustrated in FIG. 2, the supporting strap direction guiding unit 20 includes a first guiding member 21, a second guiding member 22, and a rivet 23 which rotatably coupled the first and second guiding members 21, 22 together and mounted to the backrest 15. An elongate slot 24, 25 is formed in the first and second guiding members 21, 22 respectively to allow a free end of the supporting strap 11, 12 passing therethrough respectively (see FIG. 1). In another embodiment of the present invention, the first and second guiding members 21, 22 of the supporting strap direction guiding unit 20 are un-rotatably coupled to each other. In a further embodiment of the present invention, the supporting strap direction guiding unit 20 is formed as a single member.

Figure 3A:
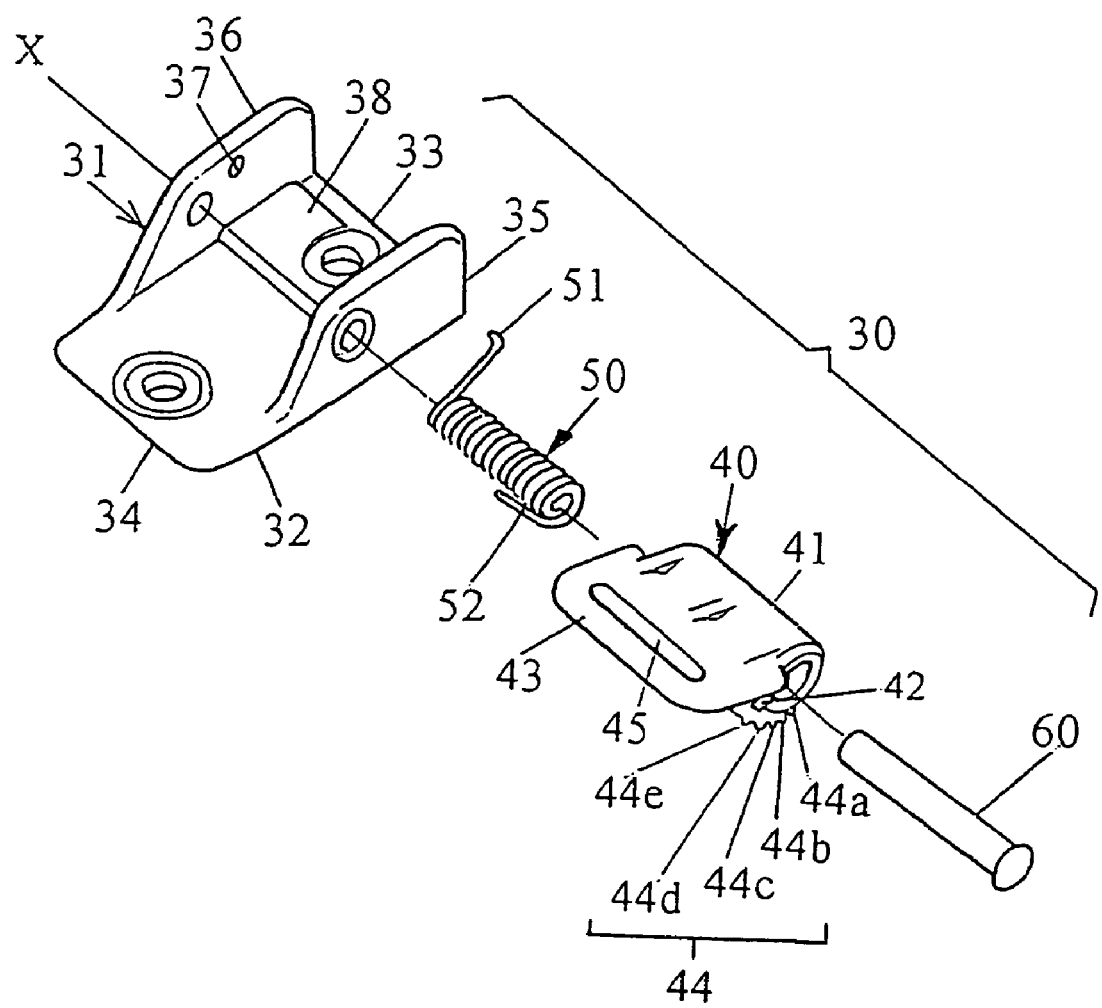
FIG. 3a is an exploded perspective view of an adjusting assembly of the stroller backrest tilting adjusting device.
Figure 3B:
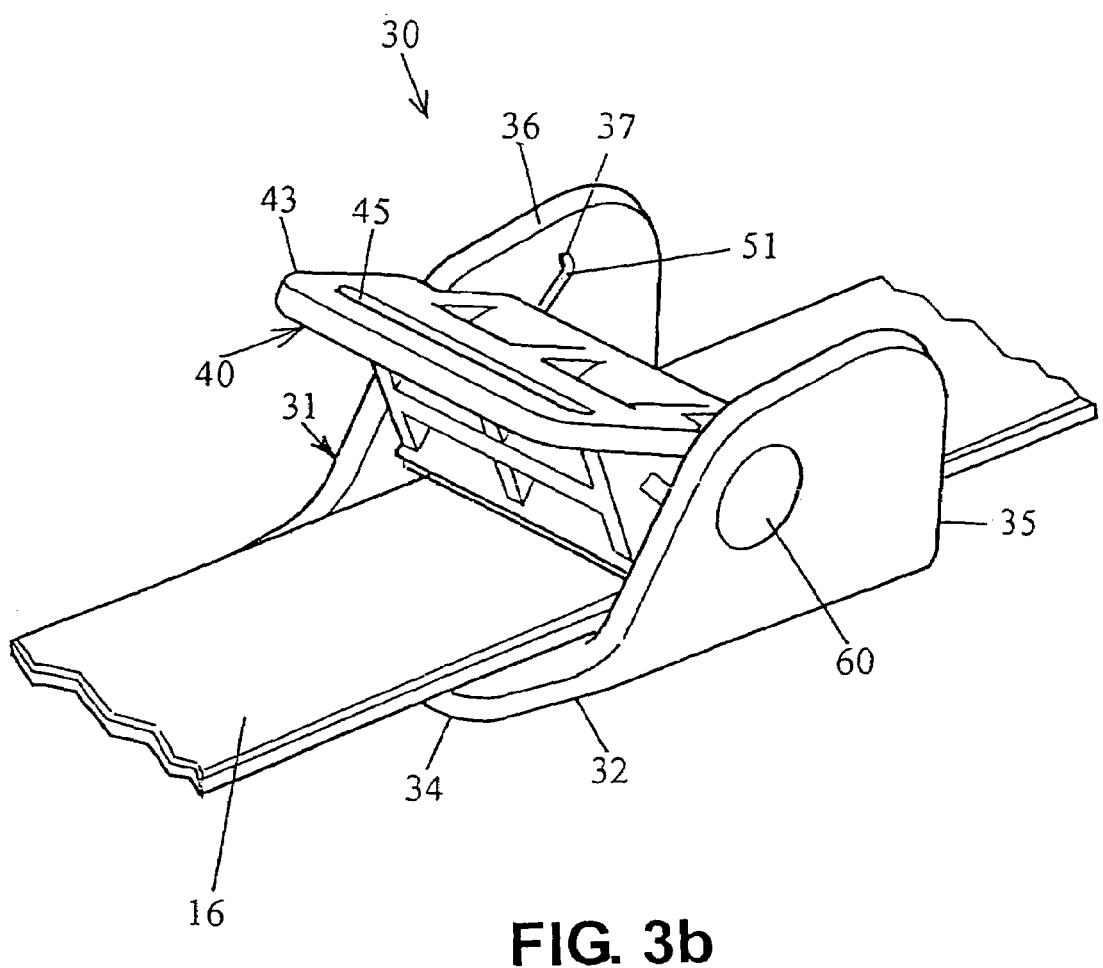
FIG. 3b is a perspective view showing the adjusting assembly of FIG. 3a in an assembled state.
Figure 4A:
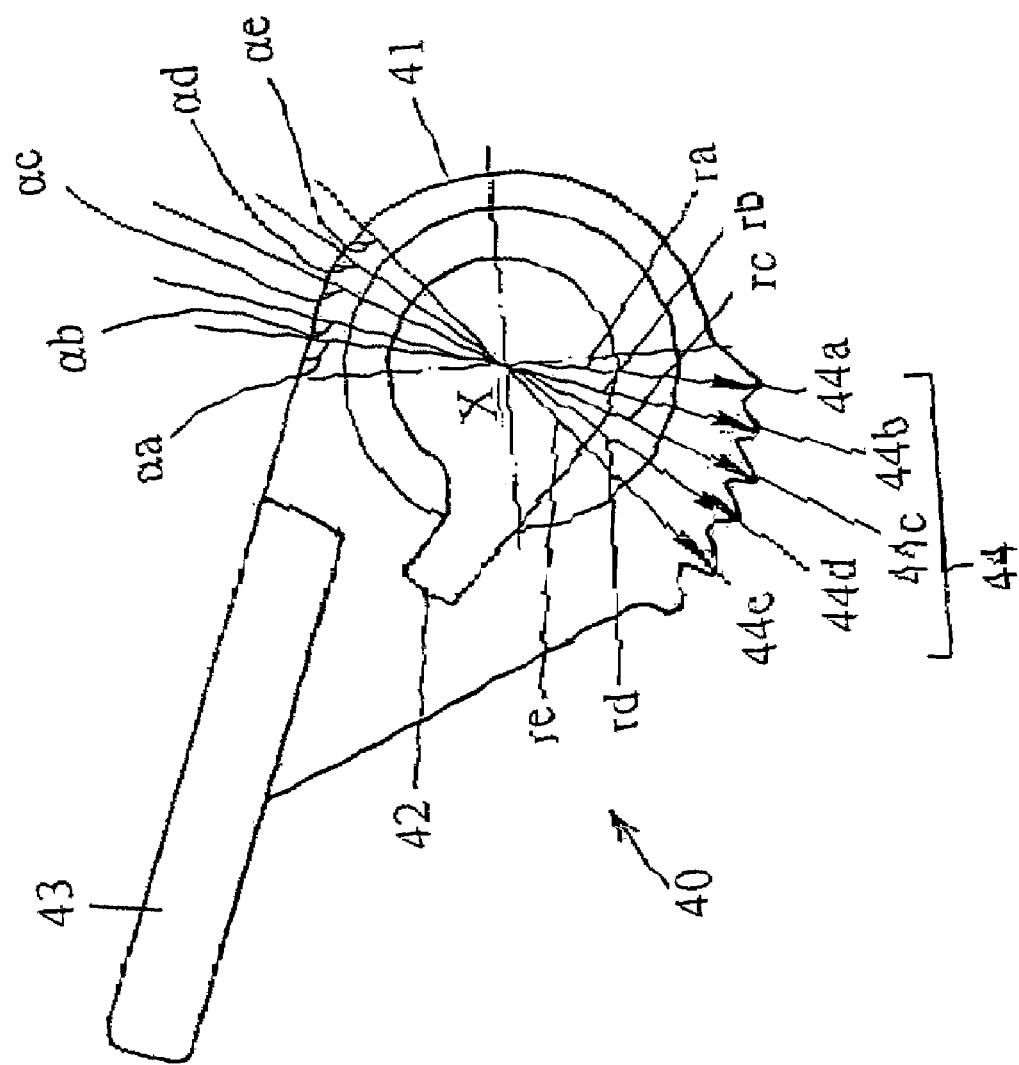
FIG. 4a is an enlarged front view of a one-way locking member of the adjusting assembly according to one embodiment of the present invention.
Figure 4B:
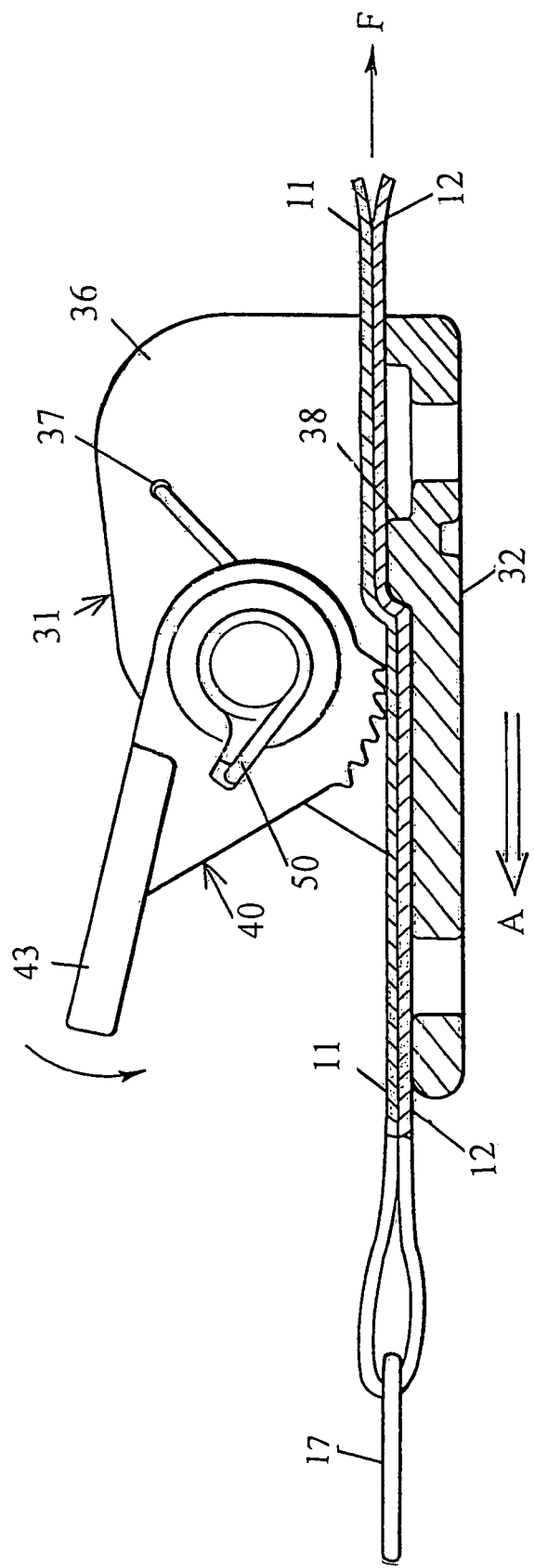
FIG. 4b is a partial front cross-sectional view showing a locking state of the adjusting assembly according to one embodiment of the present invention.
Figure 5A:
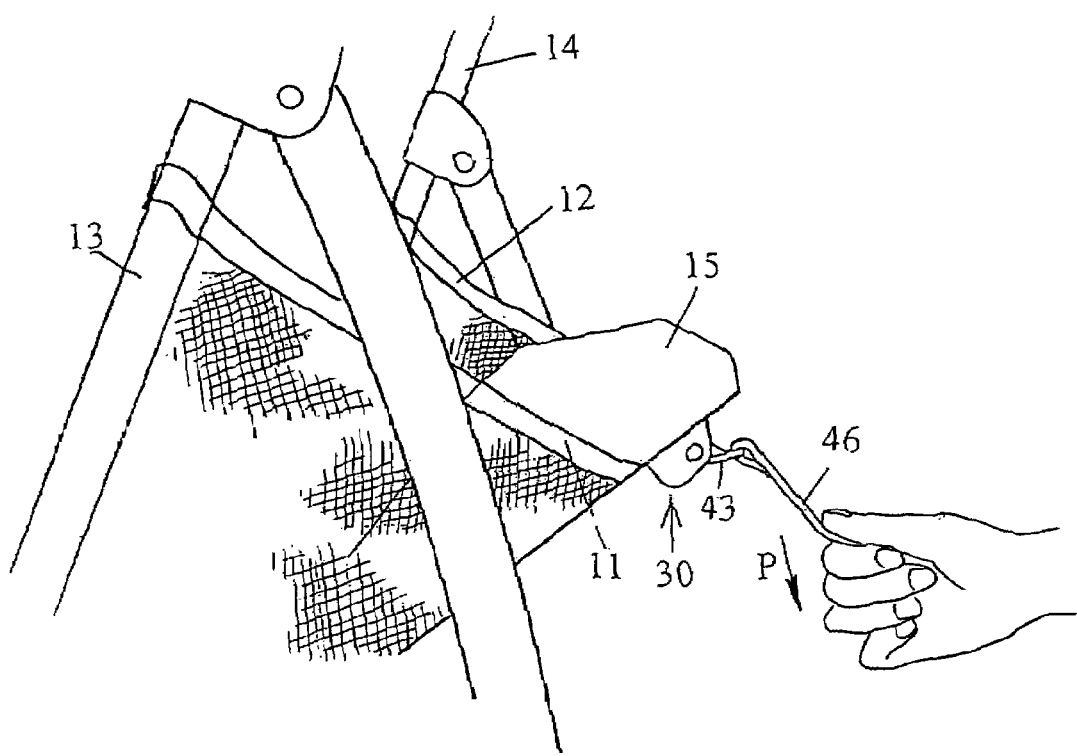
FIG. 5a is an illustrative perspective view showing an operation of the stroller backrest tilting adjusting device for tilting the backrest to a slanted position.
Figure 5B:
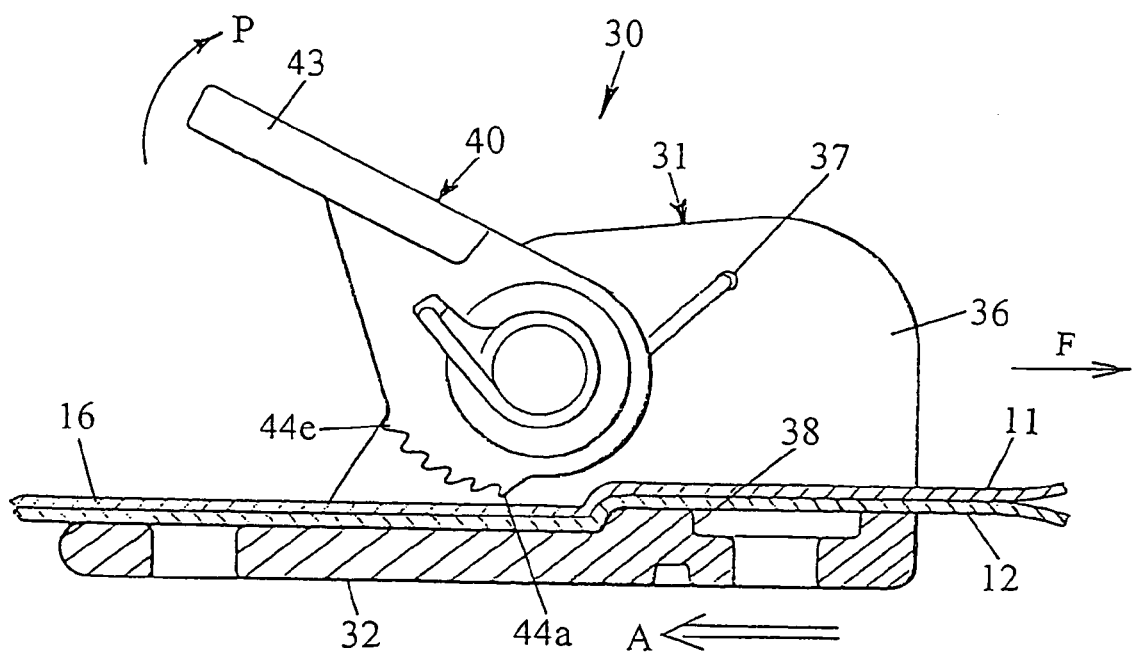

Referring now to FIGS. 3a, 3b, 4a and 4b, a detailed description to the adjusting assembly 30 is provided, wherein FIG. 3a is an exploded perspective view of the adjusting assembly 30; FIG. 3b is a perspective view of the adjusting assembly in an assembled state; FIG. 4a is an enlarged front view of a one-way locking member 40 of the adjusting assembly 30 according to one embodiment of the present invention; and FIG. 4b is a partial front cross-sectional view showing an initial locked state of the adjusting assembly 30 according to one embodiment of the present invention.

As shown in FIG. 3a, the adjusting assembly generally comprises a base member 31 which is fixed to an upper portion of a back side of the backrest 15 by a fastener, a one-way locking member 40, a biasing member 50 and a rivet 60. Specifically, the base member 31 comprises a bottom portion 32 having a strap inlet end 33, a strap outlet end 34, a step-like protuberance 38 located between the strap inlet end 33 and the strap outlet end 34, and two sidewalls 35, 36 protruding upward from two sides of the bottom portion 32 respectively. Further, an opening is formed in each of the sidewalls 35, 36 for receiving the rivet 60 and an additional hole 37 is formed in the sidewall 36 for coupling with the biasing member 50.

The one-way locking member 40 comprises a substantially hollow cylindrical body 41 having an engaging slot 42 longitudinally formed in an inner face of a sidewall thereof from one end to the other, an operating portion 43 tangentially extending out from a sidewall of the body 41 along a direction toward the strap outlet end 34 of the base member 31, and a cam effecting portion consisting of a plurality of engaging teeth 44 (in the embodiment shown in FIG. 3a, five engaging teeth 44a, 44b, 44c, 44d, and 44e are illustrated) is formed on the sidewall of the body 41 near the operating portion 43, such that each engaging tooth and the operating portion 43 forms an angle $\alpha a$, $\alpha b$, $\alpha c$, $\alpha d$, and $\alpha e$ therebetween respectively and $\alpha a > \alpha b > \alpha c > \alpha d > \alpha e$ (see FIG. 4a). Preferably, the angles between the engaging teeth 44a, 44b, 44c, 44d, and 44e and the operating portion 43 are within a range of 75 degrees to 135 degrees. In addition, each of the engaging teeth 44a, 44b, 44c, 44d, and 44e has a distance from a central axis X of the body 41 $r_a$, $r_b$, $r_c$, $r_d$, and $r_e$ respectively and this distance is inverse ration with the angle between respective corresponding engaging teeth 44 and the operating portion 43. Specifically, the greater the angle between the engaging tooth and the operating portion 43, the smaller the distance of the engaging tooth from the central axis X is, that is, $r_a < r_b < r_c < r_d < r_e$. Each of the engaging teeth 44a, 44b, 44c, 44d, and 44e has a longitudinal length substantially the same as the longitudinal length of the body 41.

Referring back to FIG. 3a, in the embodiment illustrated in FIG. 3a, the biasing member 50 is a torsion spring which has a first arm 51 and a second arm 52 and is disposed in the body 41 of the one-way locking member 40 with the first arm 51 coupling to hole 37 in the sidewall 36 of the base member 31 and the second arm 52 engaging into the slot 42 of the body 41 to thereby biasing and causing the one-way locking member 40 toward the bottom portion 32 of the base member 31. The rivet 60 passes through the openings in the sidewalls 35, 36 and through the torsion spring 50 to thereby pivotally coupling them to the base member 31, as illustrated in FIG. 3b.

Further, the free ends of the supporting strips 11, 12 passing through the elongate slots 24, 25 of the strap direction guiding unit 20 enter the adjusting assembly 30 through the strap inlet end 33 of the base member 31 and pass between the engaging teeth 44a, 44b and the bottom portion 32 of the base member 31, and then come out the adjusting assembly 30 from the strap outlet end 34. In this way, a strap inserting direction A is defined as the direction from the strap inlet end 33 to the strap outlet end 34, as illustrated in FIG. 4b. After coming out of the adjusting assembly 30, the free ends of the supporting straps 11, 12 are stitched together to formed a common free end 16, as shown in FIGS. 1 and 3b. In a preferred embodiment, a pulling-ring 17 (FIG. 6a) is provided to the common free end 16 to facilitate the pulling operation of the common free end 16 of the supporting straps 11, 12. Further, an opening 45 is formed in the operating portion 43 of the one-way locking member 40 to allow a pulling strap 46 to pass therethrough and attach to the operating portion 43. A user may pull the pulling strap 46 with one hand to actuate the operating portion 43 of the one-way locking member 40 and thereby allowing the backrest 15 being adjusted to a position of a greater tilting angle.

As mentioned above, FIG. 4b is a partial front cross-sectional view showing a locked state of the adjusting assembly 30. While in this locked state, the one-way locking member 40 is biased to pivot toward the bottom portion 32 of the base member 31 by the torsion spring 50 such that some of the engaging teeth, such as engaging teeth 44a and 44b, engage with the supporting straps 11, 12 and the supporting straps 11, 12 are firmly pressed against the bottom portion 32 of the base member 31 by the force exerted by the torsion spring 50 via the engaging teeth 44a, 44b. The supporting strips 11, 12 are further prevented from slipping by the friction force between the engaging teethe 44a, 44b and the straps 11, 12 in corporation with the step-like protuberance 38 of the bottom portion 32 of the base member 31.

When the supporting straps 11, 12 subjected to a force F in a direction opposite to the strap inserting direction A (i.e., a force that intents to pull the supporting straps 11, 12 out of the adjusting assembly 30 from the strap inlet end 33), the one-way locking member 40 will be further pivoted toward the bottom portion 32 of the base member 31 by the friction force between the engaging teeth 44 and the straps 11, 12 and cause the engaging teeth 44c, 44d to engage further deeper into the straps (because $r_e > r_d > r_c > r_b > r_a$) as well as increase the friction force between the engaging teeth 44c, 44d and the straps 11, 12 to a level that will eventually stop the supporting straps 11, 12 from moving. Thus, the arrangement of the engaging teeth 44a, 44b, 44c, 44d, and 44e may be defined by their positions relative to the pivoted angle of the one-way locking member 40. Specifically, the engaging teeth that are closer to the pivot center (i.e., the central axis X of the body 41) is located at a position that will contact the supporting straps 11, 12 when the one-way locking member 40 is pivoted a smaller angle (such as, engaging teeth 44a, 44b), and the engaging teeth that are further away from the pivot center (i.e., the central axis X of the body 41) is located at a position that will contact the supporting straps 11, 12 only when the one-way locking member 40 is pivoted a greater angle (such as, engaging teeth 44d, 44e).

Next, an operation of the stroller backrest tilting adjusting device according to the present invention will be describe below by referring to FIGS. 5a, 5b, 6a and 6b. First, an operation of adjusting the backrest 15 to a tilted position will be described by referring to FIGS. 5a and 5b. When the backrest 15 of the stroller needs to be adjusted to a tilted position, a user only needs to use just one hand to pull the operating portion 43 of the one-way locking member 40 in a direction P away from the bottom portion 32 of the base member 31, allowing the engaging teeth 44 disengage with the supporting straps 11, 12 (FIG. 5b), then the supporting straps 11, 12 will be pulled out from the adjusting assembly 30 by the weight of the backrest 15 itself and/or the weight of the infant/baby sitting in the stroller such that the backrest 15 may be tilted downward because the effective supporting length of the supporting straps 11, 12 become longer. When the backrest 15 is tilted to a desired position, the user only need to release the operating portion 43 of the one-way locking member 40 allowing the one-way locking member 40 to return to its locking position so as to lock the backrest 15 at this desired tilted position.

Figure 6A:
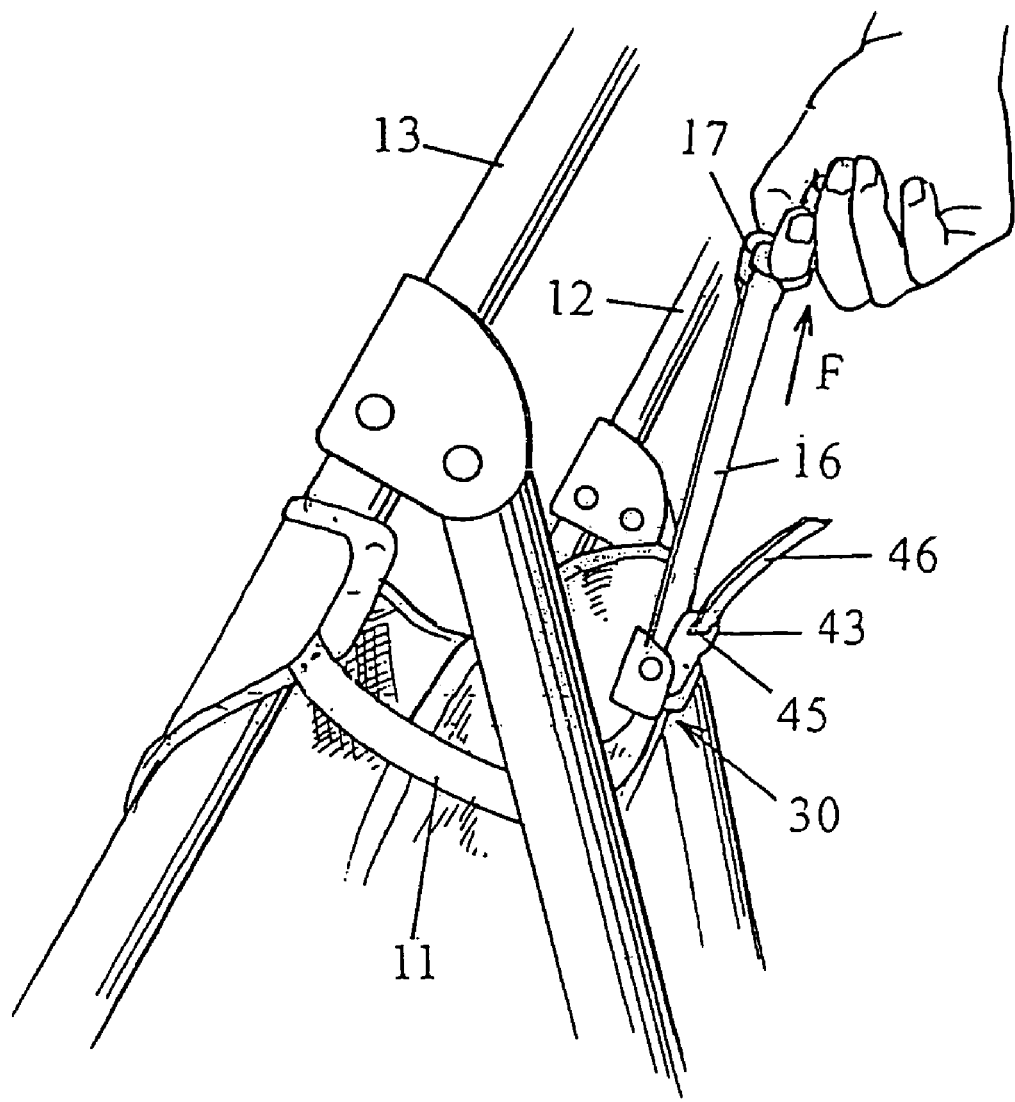
FIG. 6a is an illustrative perspective view showing an operation of the stroller backrest tilting adjusting device for moving the backrest to an upright position.
Figure 6B:
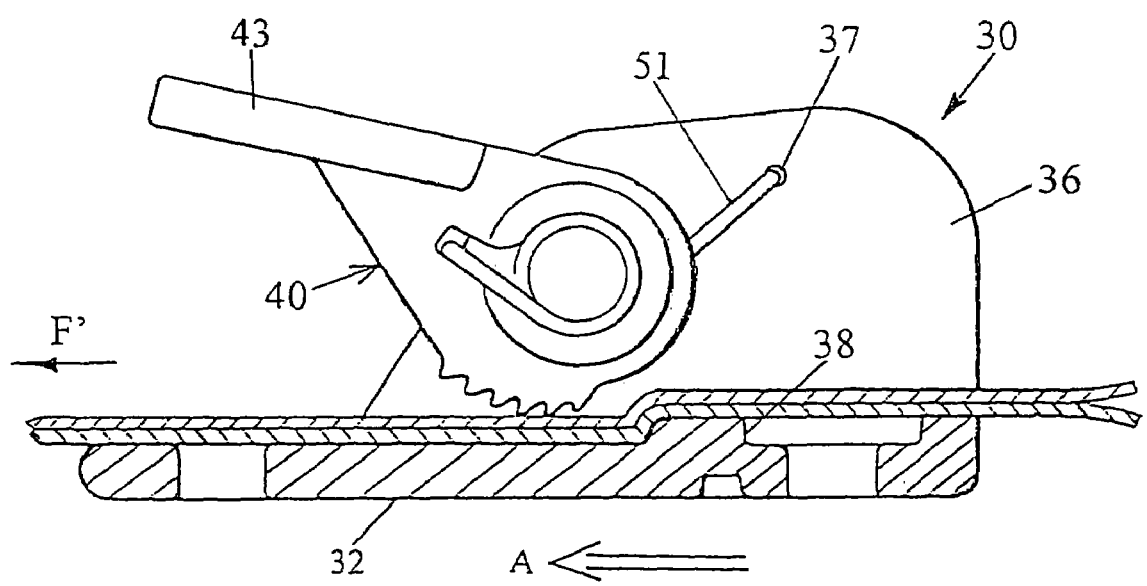

Then, an operation of adjusting the backrest 15 to an upright position will be described by referring to FIGS. 6a and 6b. When the backrest 15 needs to be raised up, the user only needs to use one hand to pull the common free end 16 of the supporting straps 11, 12 upward (see FIG. 6a), that is, exerting a F' along the strap inserting direction A (see FIG. 6b), the one-way locking member 40 will rotate away from the bottom portion 32 of the base member 31 (i.e., the clockwise direction of FIG. 6b) because of the friction force between the engaging teeth 44 and the supporting straps 11, 12 such that the engagement depth of the engaging teeth into the straps will decrease (because $r_e > r_d > r_c > r_b > r_a$) and the down-pressing force exerted by the engaging teeth will decrease and so will the friction force. At this state, the supporting straps 11, 12 can be easily pulled up along the direction of force F' and the effective supporting length of the supporting straps 11, 12 is shortened, and the backrest 15 is raised up to a upright position, as shown in FIG. 6a.

This invention has been disclosed in terms of specific embodiments. It will be apparent that many modifications can be made to the disclosed structures without departing from the invention. Therefore, it is the intent of the appended claims to cover all such variations and modifications as come within the sprit and scope of this invention.

What is claimed is:

1. A backrest tilting adjusting device of a stroller comprising:

two supporting straps for supporting a backrest of the stroller, each supporting strap having a fixed end attached to a frame of the stroller and a free end;

a strap direction guiding unit having an elongate opening formed therein to allow the free end of each of the straps passing through; and an adjusting assembly comprising:

a base member attached to an upper portion of the backrest and having a bottom portion, a strap inlet end through which the free ends of the supporting straps enter the adjusting assembly, and a strap outlet end through which the free ends of the supporting straps exit the adjusting assembly, and a strap inserting direction being defined as the direction from strap inlet end to the strap outlet end;

a one-way locking member pivotally coupled to the base member and arranged such that the straps entering the adjusting assembly pass between the base member and one-way locking member, and having an operating portion and a cam effecting portion for increasingly exerting a locking force to the straps; and a biasing member coupled to the base member and the one-way locking member for pivoting the one-way locking member toward the base member such that the cam effecting portion of the one-way locking member may engage with the straps and press them firmly against the base member, and wherein the pivoting direction of the one-way locking member is opposite to the strap inserting direction, and the cam effecting portion of the one-way locking member is adapted such that the locking force exerted by the cam effecting portion to the supporting straps against the base member will increase as the pivoted angle of the one-way locking member increase and eventually reach a level large enough to prevent the supporting straps from moving.

2. A stroller backrest tilting adjusting device according to claim 1, wherein the cam effecting portion comprises a plurality of engaging teeth, each engaging tooth having a distance r away from a pivot center of the one-way locking member and the distance r of each engaging tooth is different from each other; the engaging teeth being arranged such that the engaging tooth having the smallest distance r will engage with the supporting straps when the one-way locking member is pivoted a smallest angle, and the engaging tooth having the largest distance r engages with the supporting straps when the one-way locking member is pivoted a largest angle.

3. A stroller backrest tilting adjusting device according to claim 1, wherein the strap direction guiding unit includes two rotatably coupled guiding members and each of the guiding members has an elongate opening formed therein for a free end of the supporting strap passing through.

4. A stroller backrest tilting adjusting device according to claim 1, wherein the bottom portion of the base member is further provided with a step-like protrusion.

5. A stroller backrest tilting adjusting device according to claim 1, wherein an opening is provided in the operating portion of the one-way locking member to allow a pulling strap passing through.

6. A stroller backrest tilting adjusting device according to claim 1, wherein the one-way locking member comprises a substantially hollow cylindrical body, and the operating portion tangentially extends out from a cylindrical sidewall of the body along a direction toward the strap outlet end of the base member, and the cam effecting portion is formed at the cylindrical sidewall of the body near the operating portion, such that an angle between the cam effecting portion and the operating portion is within a range of 75 degrees to 135 degrees.

7. A stroller backrest tilting adjusting device according to claim 2, wherein the one-way locking member comprises a substantially hollow cylindrical body, and the operating portion tangentially extends out from a cylindrical sidewall of the body along a direction toward the strap outlet end of the base member, and the cam effecting portion is formed at the cylindrical sidewall of the body near the operating portion, such that an angle between the cam effecting portion and the operating portion is within a range of 75 degrees to 135 degrees.

8. A stroller backrest tilting adjusting device according to claim 6 or 7, wherein the biasing member comprises a spiral torsion spring which is disposed in the body of the one-way locking member.

9. A stroller backrest tilting adjusting device according to claim 1, wherein the free ends of the two supporting straps are bound together after coming out from the adjusting assembly to formed a common free end and a pulling-ring is provided to the common free end.

10. A stroller comprising:
a frame;
an adjustable backrest attached to the frame; and
a backrest tilting adjusting device including:
two supporting straps for supporting the backrest, each supporting strap having a fixed end attached to the frame and a free end;
a strap direction guiding unit having an elongate opening formed therein to allow the free end of each of the straps passing through; and
an adjusting assembly comprising:
a base member attached to an upper portion of the backrest and having a bottom portion, a strap inlet end through which the free ends of the supporting straps enter the adjusting assembly, and a strap outlet end through which the free ends of the supporting straps exit the adjusting assembly, and a strap inserting direction being defined as the direction from strap inlet end to the strap outlet end;
a one-way locking member pivotally coupled to the base member and arranged such that the straps entering the adjusting assembly pass between the base member and one-way locking member, and having an operating portion and a cam effecting portion for increasingly exerting a locking force to the straps; and
a biasing member coupled to the base member and the one-way locking member for pivoting the one-way locking member toward the base member such that the cam effecting portion of the one-way locking member may engage with the straps and press them firmly against the base member, and
wherein the pivoting direction of the one-way locking member is opposite to the strap inserting direction, and the cam effecting portion of the one-way locking member is adapted such that the locking force exerted by the cam effecting portion to the supporting straps against the base member will increase as the pivoted angle of the one-way locking member increase and eventually reach a level large enough to prevent the supporting straps from moving.

* * * * *